Figure 1:
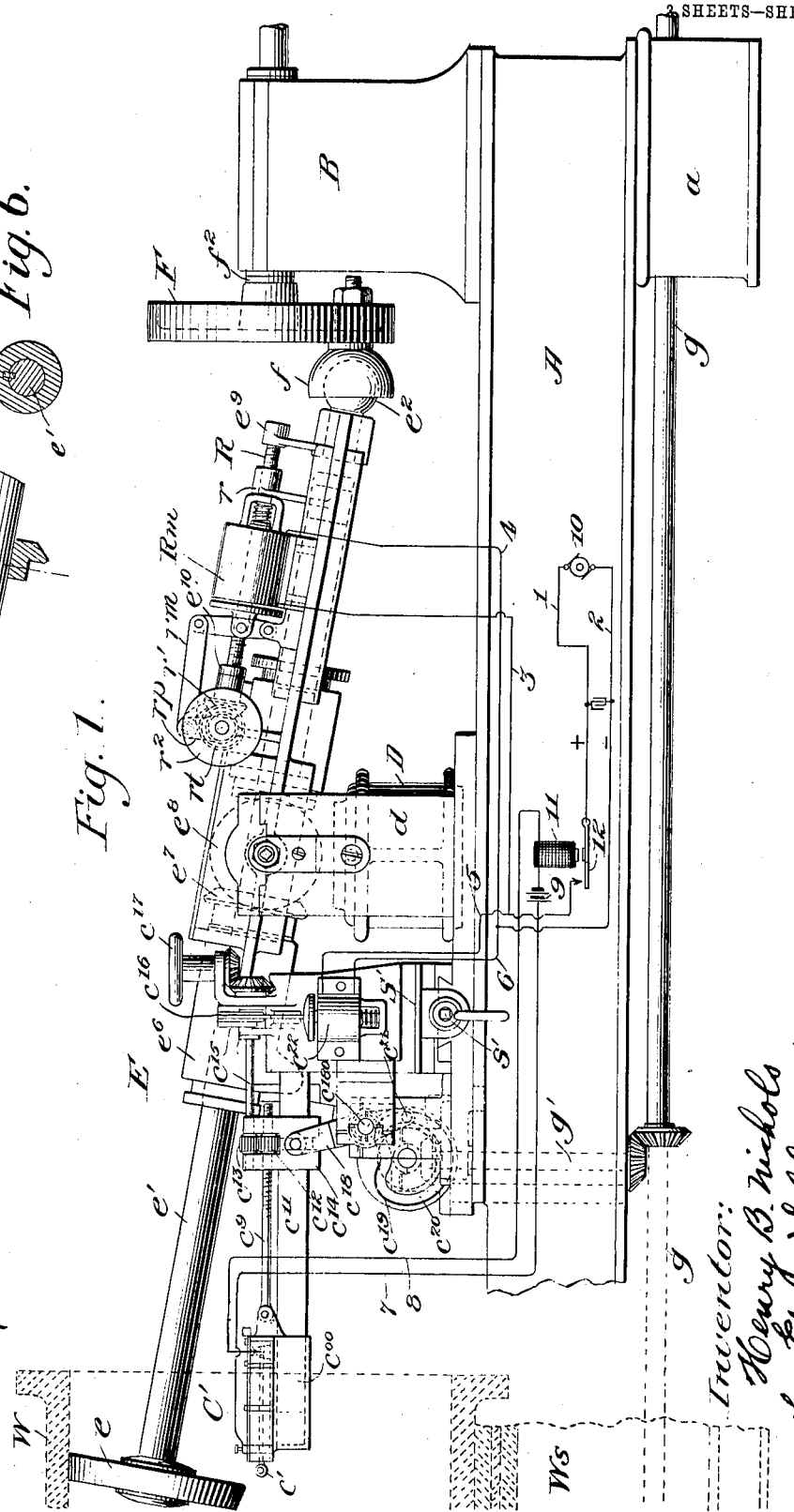

H. B. NICHOLS.
GRINDING MACHINE.
APPLICATION FILED OCT. 29, 1907.

913,543.

Patented Feb. 23, 1909.
2 SHEETS—SHEET 1.

H. B. NICHOLS.
GRINDING MACHINE.
APPLICATION FILED OCT. 29, 1907.

913,543.

Patented Feb. 23, 1909.
3 SHEETS—SHEET 3.

UNITED STATES PATENT OFFICE.

HENRY B. NICHOLS, OF PHILADELPHIA, PENNSYLVANIA.

GRINDING-MACHINE.

No. 913,543.          Specification of Letters Patent.          Patented Feb. 23, 1909.

Application filed October 29, 1907. Serial No. 399,699.

*To all whom it may concern:*

Be it known that I, HENRY B. NICHOLS, a citizen of the United States, residing at Philadelphia, in the county of Philadelphia and State of Pennsylvania, have invented certain new and useful Improvements in Grinding-Machines, of which the following is a specification, reference being had therein to the accompanying drawing.

My invention relates to grinding machines, and especially those intended for grinding curved or irregular surfaces; and it has for its object the production of a machine of this general type adapted for accurately grinding interior surfaces.

In attaining my object, I make use of the general designs illustrated and claimed in my prior patents, Nos. 807,193 and 807,194, granted December 12, 1905, and 856,721, granted June 11, 1907. The present invention is therefore in the nature of an improvement on the machines and methods disclosed and claimed in those patents, to which reference should be had and which should be read in connection with the present description.

The distinctive and characteristic features of the machines heretofore patented to me are, first, means for holding the work fixed while the cutting or grinding tool is given a double drive, so as to produce a cutting motion and a feed motion; and second, the control of both the drives and especially of the feed drive by means which permit of compensation for wear on the tool or grinding head, being supplemented for that purpose by certain manual setting devices.

The characteristic features of the present invention are, first, means for holding the work fixed while the cutting or grinding tool is given a double motion or drive, and means for automatically controlling the feed so as to produce a constant and very accurate cut.

Other features will appear from the description hereinafter.

More specifically stated, my present invention comprises a bed or frame carrying a turret or tool support with a double motion spindle journaled thereon, means to rotate the spindle, first on its own axis for cutting, and second on the axis of the curved surface of the work, and a pair of automatic calipers or regulating devices adapted to follow the tool or grinding head and automatically to control the feed so as to produce a constant and accurate cut.

The present machine is particularly suited to such work as the interior surfacing of tubular articles, such as engine cylinders, pieces of ordnance, and the like; but it may also be employed for irregular surfaces, by using a corresponding cam motion for the spindle instead of the simple rotary motion which for the sake of simplicity and clearness I shall illustrate herein. Moreover, the present machine may be termed "universal" in the sense that it can be used for both internal and external grinding, and even for grinding horizontal and vertical plane surfaces, the only requisite to this end being that the tail of the tool spindle should be reciprocated instead of rotated. For plane or outside curve grinding the calipers must be correspondingly set, and it will be understood after reading my prior patents that provision must be made for relative longitudinal feed between the work and the grinding or cutting head. Heretofore I have chosen to mount the work support upon the bed of the machine and feed the same toward the tool. The pieces of work to be handled with the present machine however may and frequently will be too heavy to move, so that I provide means for moving the entire machine longitudinally toward or into the work. For example, in grinding large pipes or cylinders, or those having a long axis, I may mount the entire grinding machine on a bed built on the cantaliver principle, the grinding head and spindle projecting some distance beyond the end of one arm. This end is then fed into the tube or cylinder. Any standard machine feed may be used for this purpose, an ordinary straight screw feed such as that described in my patents being of course the best. Since such feed forms no characteristic part of the present invention I shall not illustrate it, but it is to be understood that it will be used in every case, its form being suited to the size and character of the work.

So far as I know I am the first person to perfect a machine for the purposes stated, and I shall therefore claim the same broadly. Prior to my present invention it has been customary to bore or turn the inside of engine cylinders, guns and the like, and even with very elaborate and complicated machines the results have not always been quite satisfactory, nor have they been equal to those attainable with my grinder.

My invention is illustrated in the accompanying drawings in which—

Figure 2:
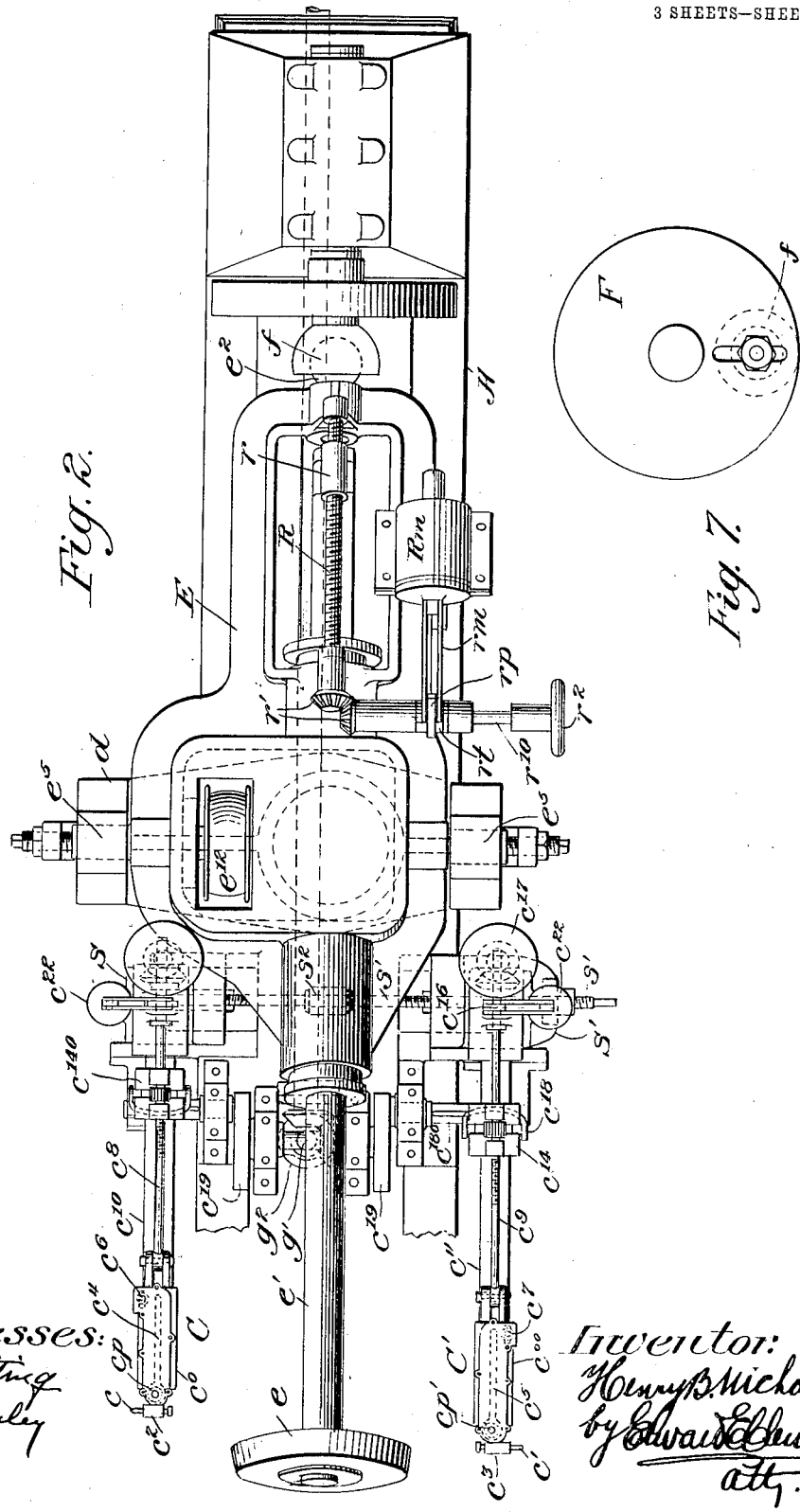
Figure 3:
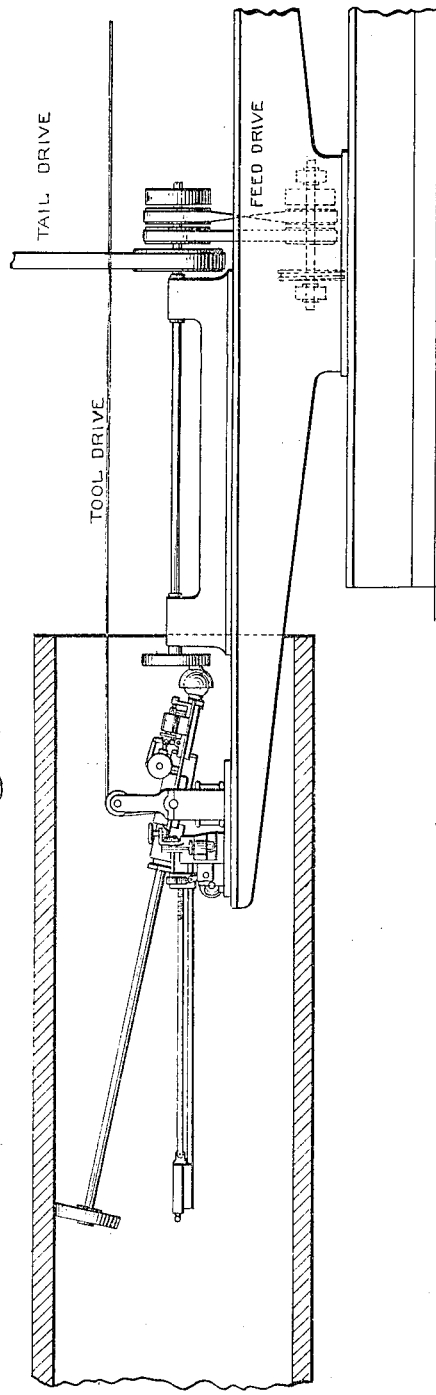
Figure 4:
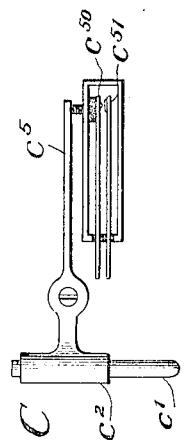

Figure 1 is a side elevation of a machine embodying my present invention. Fig. 2 is a plan view thereof. Fig. 3 is a side elevation of a similar machine mounted on a cantaliver bed for surfacing large hollow forms. Fig. 4 is a detail of one of the calipers showing a modified form of contacts. Figs. 5 and 6 are longitudinal and transverse views respectively showing the gear splined on the spindle. Fig. 7 shows the eccentric connection on the plate F.

Referring to the drawings, and particularly to Figs. 1 and 2, A represents the bed of the machine, which may be mounted upon pedestals $a$, or may be built as a cantaliver structure like that shown in Fig. 3. The form shown in Figs. 1 and 2, however, is especially adapted and intended for use with pieces of work that can be fed, so that the machine may remain fixed. Owing to the limited space available within the sight of a Patent Office drawing, I have not been able to show all the connections in Fig. 1, and I have been forced to break away and foreshorten portions of the bed and of the work support, as well as the working parts such as the spindle and the calipers. In practice these latter parts would be of relatively greater length than they appear in Figs. 1 and 2. Upon the bed A I mount the tool support or turret D, and the tailstock B. Upon the tool support is mounted a swivel yoke $d$, carrying the frame E by means of trunnions $e^5$, which together with the central pintle or swivel mounting of the yoke, give the frame E universal motion over the bed. The frame carries bearings for the tool spindle $e'$, upon the end of which is the cutting head or grinding wheel $e$. It will be understood that this head $e$ may represent and be replaced by any desired cutting tool. Specifically the present machine is a grinder, but the automatic calipering and other valuable features should not be limited in the scope of their application. The spindle $e'$ is driven by means of a pulley $e^{12}$ transmitting rotary motion to the spindle through bevel gears $e^7$ and $e^8$, the gear $e^7$ being splined on the spindle to permit longitudinal adjustment thereof. Along the rear end of the frame I provide a longitudinal feed screw R, carrying the feed nut $r$, and having its ends journaled in bearings $e^9$ and $e^{10}$. The forward end is connected through miter-gears to the transverse feed shaft $r^{10}$, which carries a ratchet $rt$ and a hand wheel $r^2$. The ratchet is controlled by a pawl $rp$, connected to the armature and plunger of a solenoid $Rm$. Each time the solenoid is energized its armature is drawn over and by means of the link $rm$ the pawl $rp$ is caused to follow, stepping around the spindle $r^{10}$, thereby turning the feed screw R, which draws up the nut $r$ so as to step the cutting head $e$ forward. In grinding this feed is especially required to compensate for the decrease in diameter of the wheel $e$ as it wears. The tail of the frame E is provided with a ball $e^2$ fitting in a socket $f$ attached eccentrically to the face plate F on the driven tail spindle $f^2$. This spindle as well as the main feed screw $g$ is turned through suitable belts and pulleys or equivalent connections, as fully illustrated and described in my prior patents. As the ratio of speeds of the tool spindle $e'$, the tail spindle $f^2$, and the feed screw or spindle $g$ are all variable and determinable for any particular work by mere changes in the sizes of the belt wheels or gears, I have thought it unnecessary to illustrate or describe the latter in detail especially as it is fully set forth in the patents referred to.

Just forward of the tool support D I mount a pair of transverse slides consisting of blocks S and S' dovetailed onto the bed or frame. On each of these blocks is carried a forwardly projecting slide or arm, and upon these slides or arms I mount the automatic calipers C and C' which form a very important and in fact essential feature of the present invention. The slide carried by block S is marked $c^{10}$; while that carried by the block S' is marked $c^{11}$. The caliper C has a head $c^2$ pivoted at $cp$ on its carriage $c^0$, and provided with a projecting arm $c^4$ which coöperates with a fixed and insulated contact point $c^6$ in the control of an electric circuit, one side of which is connected to the frame of the machine and the other to the insulated point $c^6$. The carriage $c^0$ is pivotally connected to the feed screw $c^8$, which passes back over the slide to a small pair of gears carried in a slide block $c^{140}$.

The caliper C' has the head $c^3$ pivoted at $c'$ with an arm $c^5$, and an insulated contact point $c^7$. Its carriage $c^{00}$ is pivoted on the end of the feed screw $c^9$, passing to the small gear $c^{12}$ in the slide block $c^{14}$. The parts appertaining to the two individual calipers are identical, and further description will therefore be directed only to those shown in Fig. 1, and belonging to the caliper C'. It will be observed that the slide block $c^{14}$ carries the two pinions $c^{12}$ and $c^{13}$, the latter being splined on a transverse spindle $c^{15}$ connected to the ratchet $c^{16}$ and through miter gears to the hand wheel $c^{17}$. The splining is necessary because the block $c^{14}$ is thrown back and forward once for each complete rotation of the tail plate F, that is to say for each rotation of the tool around the surface of the work. This is accomplished by means of a lever $c^{18}$ pivoted at $c^{180}$ in a bearing carried on the main frame. The upper end of this lever is bifurcated as indicated especially in Fig. 2, the prongs or arms having inwardly extending pins which take into vertical slots in the block $c^{14}$. The bifurcated arm is splined onto the transverse rock-shaft $c^{180}$ which constitutes the pivot element of the lever. This is to permit transverse adjustment of the blocks and slides as a unit, as will presently appear. The lower arm of the lever extends down within the bearings and carries a pin $c^{21}$ which travels in a cam slot formed in the face of a constantly rotating wheel $c^{19}$. The slot is shown at $c^{20}$ in Fig. 1, and is regular or circular throughout the greater part of its length so as to produce no motion radially of the pin $c^{21}$, but at one portion the slot takes an inward dip so as to throw the pin in and throw the lever arm back so as to draw back the block $c^{14}$ and with it the carriage $c^{00}$ with its caliper C'. The cam is set so that this dip and withdrawal will take place immediately after the cutting head $e$ has passed the spot touched by the point $c'$ of the caliper. In short, this entire rigging of slide and cam is intended to momentarily insert the caliper into the path of the cutting head and then to withdraw and keep the same out of the line of the cutting head until the latter has passed the spot to be touched by point $c'$ of the caliper. It will be understood of course, that the two cams governing the two calipers C and C' are set with their dips 180 degrees apart, for obvious reasons. If there are more than two calipers they would be set at corresponding angles, so that each caliper in turn would be inserted into and withdrawn from the path of the cutting head. The cam wheels are constantly driven by means of miter gears connected to a vertical spindle $g'$, off the main feed screw $g$.

I have stated that the blocks S and S', which carry all of the caliper parts, are mounted upon transverse slides. These blocks are adjusted by means of a right and left hand screw shaft $s$ and $s'$ provided with collars and turning in a fixed bearing $s^2$ against which the collars abut. The shaft is turned to set up the blocks by means of a wrench. This transverse adjustment is obviously necessary as a concomitant of the radial adjustment of the socket $f$, so as to enable the machine to be used and readily adjusted to bore or grind forms of different diameters.

In Fig. 1 I have indicated a piece of work W, supposed to be slidably mounted on a fixed support W$s$, and controlled for feed purposes by the main screw $g$. This is sufficient to indicate the necessary provisions and connections to be made in practice. The calipers have their contacts included in a circuit 7—8, which also includes a battery 9 and a relay 11. This relay has an armature 12 which has a pair of contacts controlling the circuit 1—2 taking current from a generator 10, and bridged by capacity 13 for the purpose of taking up spark. One branch 3—4 of this circuit goes to the solenoid R$m$, and another branch 5—6 goes to each of the solenoids $c^{22}$. Closure of the caliper contacts on either side results in energization of the relay 11, closure of the circuit 1—2—3—4—5—6, and the passage of working current through the solenoids R$m$ and $c^{22}$. These solenoids all pull up their arms simultaneously, each works its ratchet, and the cutting head with both the calipers is thereby stepped forward a small fraction of an inch. It should be noted that this feed is by relatively small divisions of the face of the wheel $e$, so that a slight inequality or wear at the front cutting edge of the wheel affects the calipers and is then corrected after the feed before the rear edge of the wheel is reached. By this means the accuracy of my machine as a grinder is rendered much greater than that of the regular boring tools, although the latter if equipped with my system of calipers would give better results than without it.

The operation of my machine will now be sufficiently clear. The adjustments are made for the diameter desired and the operation of the longitudinal feed screw $g$ or its equivalent brings the work and the cutting tool together. As the cut progresses, the caliper points (which may advantageously be of hard steel with iridium tips) are pushed along in the same plane with the cutting edge of the wheel. As the latter wears, the cut becomes slightly lighter, and a very slight variation pushes the pin $c$ or $c'$ inward, swinging the long lever $c^4$ or $c^5$ until it touches the contact $c^6$ or $c^7$, either one of these serving to close its branch of the circuit 7—8, and energize the relay 11 to close the circuit 1—2—3—4—5—6 and energize the solenoids so as to feed the wheel forward and the calipers with it. Since the wheel works on an angle this forward feed of course compensates for wear. The only case where this is reversed is in outside grinding, as shown in my former patents, when of course the wheel would be secured on the spindle in a position the reverse of that shown in Fig. 1 herein. The ratchets would also be reversed so that all the parts would feed backward instead of forward. In straight line or plane work, the tail sockets must reciprocate straight up and down, the calipers must be brought in so as to be within the diameter of the wheel, and the latter will then swing in a vertical arc, grinding parallel surfaces on its opposite faces simultaneously if desired. This feature is of value in heavy plate work, and where the plates are fixed in place, and cannot be moved, as on a ship, the feed screws should move the body of the machine with relation thereto in order to carry the tool over the face of the work. The simplest way to reciprocate the tail of the frame E up and down is to make a cam slot in the face plate F on the tail spindle, set the ball or an equivalent pin $e^2$ in said slot and lock the turret D against horizontal rotation. Obviously somewhat similar provision might be made for moving the cutting head horizontally instead of vertically, and with the foregoing remarks the necessary changes will be obvious to those skilled in the art.

Referring now to Fig. 3, it will be seen that I have shown the machine mounted on a cantaliver bed, so as to indicate its applicability to large tubular work.

In Fig. 4 I show a form of inclosed contact, which may be advantageously used on the calipers and will exclude dust, oil, etc. The lever of the caliper works the inclosed contact springs by means of the insulating stud shown.

I have thus described one embodiment, and have suggested other embodiments of my invention. It is quite obvious that numerous changes and modifications may be made in the machine or in the method of its employment. I reserve the right to make such changes myself, and regard them as well within the scope of my claims and of my invention so long as they do not involve departures from the essential features and principles stated herein.

Having thus described my invention what I claim and desire to secure by Letters Patent is—

1. A grinding machine having a tool spindle, means for driving the same, and automatic means controlled by the ground or cut surface of the work to adjust and feed said spindle for further cutting.

2. A surfacing machine having a cutting or grinding tool, means for feeding or adjusting the same with reference to the work, and automatic means controlled by the elevation of the cut surface for actuating said feeding means.

3. In a machine of the class described, a cutting tool, means for driving the same, and an automatic caliper controlling the feed of said tool during the cut.

4. In a grinding machine, the combination with the frame thereof of a tool-support fixed upon said frame, a tool-spindle movably mounted upon said support, a work support or tail stop with relative feed between the same and the frame, means to impart a cutting motion to said tool-spindle and tool, means to feed said tool-spindle in said support, and automatic calipering means governing the same throughout the cut.

5. In a grinding machine, a bed plate, a work support, a cutting or grinding tool and a support therefor, the tool having longitudinal feed upon said support, and automatic means for controlling said feed during the cut together with means for driving said tool.

6. In a grinding machine, the combination with a work support of a tool support, a tool-spindle swiveled for universal movement therein, automatic means for adjusting said tool-spindle relative to said work, means to rotate said spindle operative in all the angular positions thereof, means to guide the spindle to impart the desired contour to the work, and means to produce relative feed between said work support and said tool support.

7. In a grinding machine, the combination with a frame, of a work support, a tool support carried by said frame, a tool spindle mounted therein and means to rotate the same, means for automatically adjusting said tool-spindle relative to said work, and driving means carried by said frame and connected to the spindle to impart to the latter a shaping motion whereby the desired contour of the work may be produced.

8. In a machine of the class described, the combination of a work supoprt, a tool support, a bearing member universally swiveled on the latter, a tool-spindle journaled in said bearing member and carrying a cutting or abrading tool, a head-stock, a rotatable face plate carried thereby, an extension on said bearing member adapted to engage said face plate, a feed screw journaled longitudinally in said extension and connections therefrom to said spindle, whereby the latter may be adjusted longitudinally in said bearing member, and means associated with the tool in its travel, to automatically regulate said feed screw.

9. In an internal grinder, a tool support having universal motion, a tool-spindle having longitudinal adjustment with respect to said support, and automatic means associated with the spindle and acting to adjust the same so as to correct variations in the cut, and maintain the same constant.

10. In a machine of the class described, a tool-spindle carrying a cutting or grinding head, means to impart motion thereto for cutting purposes and means to guide the same over the surface of the work, longitudinal adjusting mechanism for said spindle, a calipering device connected to automatically control said adjusting mechanism during the cut and means to project said calipering device into contact with the work in the path of the cutting head and remove the same therefrom alternately.

11. In a machine of the class described, a tool-spindle carrying a cutting or grinding head, means to impart motion thereto for cutting purposes and means to guide the same over the surface of the work, longitudinal adjusting mechanism for said spindle, a calipering device connected to automatically control said adjusting mechanism during the cut and automatic means to project said calipering device into contact with the work in the path of the cutting head and remove the same therefrom alternately.

12. In a machine of the class described, a tool-spindle carrying a cutting or grinding head, means to impart motion thereto for cutting purposes and means to guide the same over the surface of the work, longitudinal adjusting mechanism for said spindle, a calipering device connected to automatically control said adjusting mechanism during the cut, means to project said calipering device into the path of the cutting head and remove the same therefrom alternately, and an automatic feed for the calipering device.

13. In a machine of the class described, the combination of the following instrumentalities: a tool-spindle carrying a cutting or grinding head, means to impart motion thereto for cutting purposes and means to guide the same over the surface of the work, a longitudinal feed screw for said spindle, a ratchet mechanism for turning said screw, electromagnetic means for actuating said ratchet, a gage or caliper carried so as to follow the tool or cutting head over the cut, a source of electric current, and a circuit controlled by said gage or caliper and including said source of current and the electromagnetic means.

14. In a machine of the class described, the combination of the following instrumentalities: a tool-spindle carrying a cutting or grinding head, means to impart motion thereto for cutting purposes and means to guide the same over the surface of the work, a longitudinal screw feed upon said spindle, a ratchet mechanism for the feed screw, a gage or caliper held in the path of the cut over the work, and connecting means whereby said gage or caliper will actuate said ratchet mechanism upon the occurrence of a variation in the cut.

15. In a machine of the class described, the combination with the following instrumentalities: a tool-spindle carrying a cutting or grinding head, means to impart motion thereto for cutting purposes and means to guide the same over the surface of the work, a longitudinal screw feed upon said spindle, a ratchet mechanism for the screw, a gage or caliper held in the path of the cut over the work, a longitudinal screw feed for said gage or caliper, a ratchet for the same, and means whereby said gage or caliper in passing over the cut will respond to variations therein and actuate both of said ratchets.

16. In a machine of the class described, the combination with the following instrumentalities: a tool-spindle carrying a cutting or grinding head, means to impart motion thereto for cutting purposes and means to guide the same over the surface of the work, a longitudinal feed screw for said spindle, a ratchet mechanism for turning said screw, electromagnetic means for actuating said ratchet, a gage or caliper carried so as to follow the tool or cutting head over the cut, a longitudinal screw feed therefor, a ratchet mechanism for turning the feed screw, electromagnetic means for actuating said ratchet, a source of electric current and circuit connections including said source, a pair of contacts controlled by said caliper or gage, and both of said electromagnetic actuating means, whereby any variation in the cut will produce a feed of both spindle and caliper.

17. In a machine of the class described, the combination of the following instrumentalities: a tool-spindle and a cutting or grinding head carried thereon, means to turn the spindle for cutting purposes, and means to move the spindle so as to guide the cutting head over the surface of the work, a longitudinal feed for said spindle, and a pair of calipers or gages mounted upon opposite sides of said cutting head for actuating said feed as required by variations in the cut.

18. In a machine of the class described, the combination of the following instrumentalities: a tool-spindle and a cutting or grinding head carried thereon, means to turn the spindle for cutting purposes, means to move the spindle along lines outside of its axis so as to guide the cutting head over the surface of the work, means for feeding the spindle longitudinally, and a pair of calipers or gages movably mounted on opposite sides of the spindle, with means to move said calipers alternately into and out of the direct line of cut of the tool, and connections from both calipers to the longitudinal feeding means.

19. In a machine of the class described, the combination of a cutting tool and a work support with means for producing relative motion therebetween, and automatic calipering means governing the entire cut of the tool.

20. In a machine of the class described, the combination of a cutting tool and an automatic caliper, with means whereby said caliper may regulate the entire cut of the tool.

21. In a machine of the class described, a cutting tool, a work support, means to produce relative feed between the same, an automatic caliper, connections therefrom to the feed producing means, and means to produce feed of the caliper during the cut.

22. In a machine of the class described, a cutting tool, a work support, operating means, normal relative feed means, regulating feed means, and an automatic controller for the latter responding to variations in the condition of the work during the entire cut.

23. In a machine of the class described, a cutting tool, a work support, operating means, relative feed means, and an automatic caliper comprising a bearing point and a pair of electric contacts acted upon thereby, together with an electromagnet controlling said feed means and controlled by said contacts during the entire cut.

24. In a machine of the class described, a cutting tool, a work support, means to produce relative feed between the same, and an automatic caliper comprising a frame or slide, a contact point thereon, and a pair of electrical contacts governed thereby, together with a suitable source of current and electromagnetic feed actuating means connected to said contacts.

25. In a machine of the class described, the combination of the following instrumentalities: a bed-plate or support, a head-stock or work support, a tool support or turret and a tail-stock secured upon said bed-plate, a frame or journal member having universal motion on said tool support, a tool spindle journaled in said frame, driving means mounted on said frame for rotating the spindle, driving means mounted in the tail-stock and eccentrically connected to said frame so as to produce rotary motion thereof and of the spindle and its tool, a longitudinal feed screw mounted on the frame parallel to the spindle and connected thereto for the purpose of feeding the tool, a ratchet for said feed screw and a controlling electromagnet for the ratchet, together with alternative manual controlling means therefor, a pair of slides mounted on opposite sides of the spindle parallel to the bed-plate, a pair of pivoted calipers and electric contacts controlled thereby mounted on blocks or carriages fitted to said slides, longitudinal feed screws for said carriages, and a pair of cams connected so as to alternately reciprocate the same on the slides during the operation of the tool, a pair of ratchets for the caliper feeds, a pair of electromagnets controlling said ratchets, a source of current and circuit connections including said source and all the feed magnets, together with the caliper contacts, the latter in parallel so that the closure of either pair of contacts will actuate the feeds, supplementary or alternative manual operating means for the caliper feeds, and a pair of transverse slides supporting the caliper slides with all their attachments, so as to permit of lateral adjustment thereof to accommodate pieces of work of different sizes.

26. In apparatus for internally surfacing hollow forms, a cutting or grinding head and driving means therefor, with a cantaliver support or mounting having one end forming a long arm carrying said mechanism, whereby the same may be inserted bodily into the form constituting the work.

27. In a surfacing machine, means for effecting a cut or removal of material over the desired surface, and means responsive to variations in the cut surface from a predetermined standard, acting to regulate further cutting or removal, said action and regulation being automatic.

28. In a machine of the class described, a cutting tool, a work support, means for producing relative cutting motion between the tool and work, electromagnetic means for regulating the cut, and an automatic electric caliper controlling said electromagnetic means.

29. In a machine of the class described, a cutting or grinding tool, means for feeding or adjusting the same with reference to the work, and electromagnetic means controlled by an elevation of the cut surface for actuating said feeding means.

30. In a machine of the class described, a cutting or grinding tool, means for producing relative feed or adjustment of the same with reference to the work, and an electric caliper governing said means.

In testimony whereof I affix my signature in presence of two witnesses.

HENRY B. NICHOLS.

Witnesses:
C. B. VOYNOW,
GEO. B. TAYLOR.